United States Patent
Stockard

(10) Patent No.: US 9,333,825 B2
(45) Date of Patent: May 10, 2016

(54) VEHICLE FRONT SUSPENSION LOWER CONTROL ARM ATTACHMENT SYSTEM

(71) Applicant: GM Global Technology Operations LLC, Detroit, MI (US)

(72) Inventor: Michael L. Stockard, Oxford, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 13/840,458

(22) Filed: Mar. 15, 2013

(65) Prior Publication Data

US 2014/0265206 A1    Sep. 18, 2014

(51) Int. Cl.
| | | |
|---|---|---|
| *B60G 7/00* | (2006.01) | |
| *B60G 7/02* | (2006.01) | |
| *B23P 11/00* | (2006.01) | |
| *B62D 21/11* | (2006.01) | |

(52) U.S. Cl.
CPC ............... *B60G 7/008* (2013.01); *B23P 11/00* (2013.01); *B60G 7/001* (2013.01); *B60G 7/02* (2013.01); *B60G 2204/1431* (2013.01); *B62D 21/11* (2013.01); *Y10T 29/49826* (2015.01); *Y10T 29/49948* (2015.01)

(58) Field of Classification Search
CPC ............. B62D 21/11; B60G 3/02; B60G 3/04; B60G 7/001; B60G 7/008; B60G 7/02; B60G 2200/142; B60G 2200/1424; B60G 2200/154; B60G 2200/156; B60G 2204/143; B60G 2204/1431; B60G 2204/147; B60G 2204/15; B60G 2206/604; B23P 11/00; Y10T 29/49948; Y10T 29/49826

USPC ............. 180/312; 280/124.109, 124.134, 280/124.15; 296/193.07, 204; 411/338; 403/200

See application file for complete search history.

(56) References Cited

U.S. PATENT DOCUMENTS

| | | | | |
|---|---|---|---|---|
| 2,111,267 | A | * | 3/1938 | Hoppenstand ................ 411/338 |
| 3,099,458 | A | * | 7/1963 | Wenzel et al. ........... 280/124.15 |
| 3,195,914 | A | * | 7/1965 | Rosky .................... 280/124.142 |
| 4,033,243 | A | * | 7/1977 | Kirrish et al. ................ 411/338 |
| 4,059,286 | A | * | 11/1977 | Otto et al. ............. 280/124.109 |
| 4,240,517 | A | * | 12/1980 | Harlow et al. ................ 180/295 |
| 4,263,980 | A | * | 4/1981 | Harlow et al. ................ 180/292 |
| 4,406,343 | A | * | 9/1983 | Harasaki ...................... 180/297 |
| 4,540,197 | A | * | 9/1985 | Finn et al. .................. 280/6.157 |

(Continued)

FOREIGN PATENT DOCUMENTS

| | | | | |
|---|---|---|---|---|
| CN | 102781689 A | | 11/2012 | |
| JP | 03197218 A | * | 8/1991 | ............... B60G 3/20 |

OTHER PUBLICATIONS

Control Arm; from Wikipedia,en.wikipedio.org/wiki/Control_arm; 1 page.

(Continued)

*Primary Examiner* — Laura Freedman
(74) *Attorney, Agent, or Firm* — BrooksGroup

(57) ABSTRACT

A number of variations of the invention may include a method including providing a front lower control arm attachment system including a sleeve locator stamping and at least one threaded sleeve extending there through, and attaching the front lower control arm attachment system to a vehicle engine cradle. A number of variations of the invention may include a front lower control arm attachment system including a sleeve locator stamping and at least one threaded sleeve extending through the sleeve locator stamping and secured thereto.

20 Claims, 3 Drawing Sheets

(56) References Cited

U.S. PATENT DOCUMENTS

| | | | | |
|---|---|---|---|---|
| 4,720,120 | A | * | 1/1988 | Shimatani et al. ..... 280/124.109 |
| 4,762,336 | A | * | 8/1988 | Ogawa et al. ............ 280/124.15 |
| 4,763,948 | A | * | 8/1988 | Harasaki ................. 296/203.02 |
| 5,031,928 | A | * | 7/1991 | Tsubota et al. .......... 280/86.756 |
| 5,183,286 | A | * | 2/1993 | Ayabe ....................... 280/124.1 |
| 5,409,283 | A | * | 4/1995 | Ban .............................. 296/35.1 |
| 5,443,280 | A | * | 8/1995 | Kawaguchi et al. ... 280/124.128 |
| 6,361,096 | B2 | * | 3/2002 | Kim .............................. 296/35.1 |
| 6,402,172 | B1 | * | 6/2002 | Suzuki .................. 280/124.109 |
| 6,409,216 | B2 | * | 6/2002 | Suzuki ........................ 280/781 |
| 6,494,472 | B2 | * | 12/2002 | Suzuki .................. 280/124.109 |
| 7,125,028 | B2 | * | 10/2006 | Ham ...................... 280/124.134 |
| 7,458,594 | B2 | * | 12/2008 | Kim ....................... 280/124.134 |
| 7,520,514 | B2 | * | 4/2009 | Ogawa et al. .......... 280/124.109 |
| 7,654,543 | B2 | * | 2/2010 | Tanaka et al. .......... 280/124.109 |
| 8,408,568 | B2 | * | 4/2013 | Yanagida ............. 280/124.128 |
| 8,434,982 | B2 | * | 5/2013 | Henriksen, Jr. ............... 411/338 |
| 8,540,261 | B2 | * | 9/2013 | Okamoto ............... 280/124.134 |
| 8,646,793 | B1 | * | 2/2014 | Lam et al. .............. 280/124.145 |
| 2006/0151970 | A1 | * | 7/2006 | Kaminski et al. ...... 280/124.134 |
| 2013/0075994 | A1 | * | 3/2013 | Lee et al. ................. 280/124.11 |

OTHER PUBLICATIONS

Front Suspension, General Motors "A", "J", & "X" Bodies; copyright 2003 Mitchell Repair Information Co.; 2 pages.

Removal & Installation ; www.autozone.com/autozone/repairguides/GM-Century-Lumina-Grand-Prix-Intrigue-1997-2000/FRONT-SUSPENSION/Lower-control-arm/_/P-0900c1528021 . . . ; 4 Pages.

Lower Control Arm, Removal & Installation ;www.autozone.com/autozone/repairguides/Chrysler-Front-Wheel-Drive-Cars-6-CYL-1988-1995-Repair-Information/FRONT-SUSPENSION/Lower-Control-A . . . ; 6 Pages.

Chinese Office Action dated Sep. 6, 2015; Application No. 201410094475.1 ; Applicant:GM Global Technology Operations LLC. ; 11 pages.

* cited by examiner

VEHICLE FRONT SUSPENSION LOWER CONTROL ARM ATTACHMENT SYSTEM

TECHNICAL FIELD

The field to which the disclosure generally relates to includes a vehicle lower control arm attachment system, vehicles having a lower control arm attachment system attached to the engine cradle of a vehicle, methods of attaching a vehicle lower control arm attachment system to an engine cradle, and methods of attaching a lower control arm to a vehicle engine cradle.

BACKGROUND

Vehicles may include an engine cradle and a suspension system having a lower control arm.

SUMMARY OF ILLUSTRATIVE VARIATIONS OF THE INVENTION

A number of variations of the invention may include a method including providing a front lower control arm attachment system including a sleeve locator stamping and at least one threaded sleeve extending there through, and attaching the front lower control arm attachment system to a vehicle engine cradle.

A number of variations of the invention may include a method including providing a front lower control arm attachment system including a sleeve locator stamping having a through hole formed therein, inserting at least one threaded sleeve through the through hole and securing the threaded sleeve to the sleeve locator stamping.

A number of variations of the invention may include a method including providing a front lower control arm attachment system including a sleeve locator stamping having a through hole formed therein with at least one threaded sleeve extending through the through hole, providing a vehicle engine cradle having a side rail having a front face and a rear face, wherein the side rail has a through hole formed therein, inserting the threaded sleeve and a through hole formed in a side rail of so that sleeve locator stamping engages the rear face of the side rail, placing a bracket assembly having a through hole formed therein in engagement with the front face of the side rail and so that the threaded sleeve extends through the through hole and the bracket assembly, and securing the bracket assembly to the front face of the side rail.

A number of variations of the invention may include a front lower control arm attachment system including a sleeve locator stamping and at least one threaded sleeve extending through the sleeve locator stamping and secured thereto.

A number of variations of the invention may include a front lower control arm attachment system further including a bracket assembly having a through hole formed therein for securing to a front face of a side rail of an engine cradle.

Other illustrative variations of the invention will become apparent from the detailed description provided hereinafter. It should be understood that the detailed description and specific examples, while disclosing optional variations of the invention, are intended for purposes of illustration only and are not intended to limit the scope of the invention.

BRIEF DESCRIPTION OF THE DRAWINGS

Select examples of variations of the invention will become more fully understood from the detailed description and the accompanying drawings, wherein.

DETAILED DESCRIPTION OF ILLUSTRATIVE VARIATIONS OF THE INVENTION

The following description of the variations is merely illustrative in nature and is in no way intended to limit the invention, its application, or uses.

Figure 1:
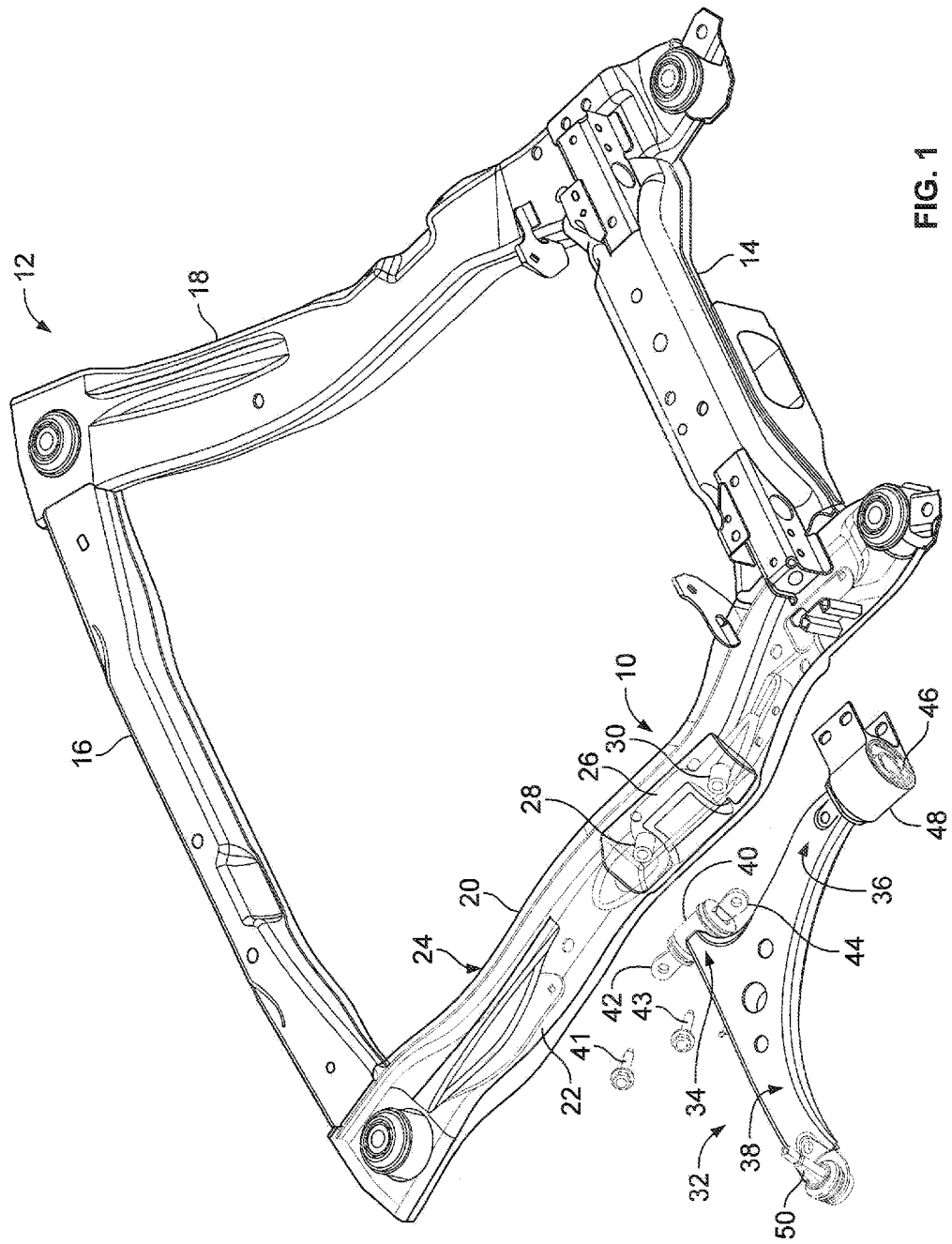
FIG. 1 is a perspective view illustrating a product which may include a front lower control arm attachment system secured to a vehicle engine cradle according to a number of variations of the invention.

FIG. 1 illustrates a number of variations of the invention including a product 10 which may include a front lower control arm attachment system secured to a vehicle engine cradle 12. The vehicle engine cradle 12 may include a front cross rail 14 and an opposite rear cross rail 16, a first side rail 18 and an opposite second side rail 20. Wherein each of the first side rail 18 and the second side rail 20 are connected to the front cross rail 14 and rear cross rail 16. The second side rail 20 may include a front face 22 and a rear face 24. The front lower control arm attachment system may include a bracket assembly 26 having a first and second through hole formed therein. A first threaded sleeve 28 may extend through the first through hole in the bracket assembly 26 and a second threaded sleeve 30 extending through the second through hole in the bracket assembly 26.

A lower control arm 32 may be provided and may include have a a generally triangular or wishbone configuration including a first elongated portion 34, a second elongated portion 36, and a third elongated portion 38. A first pivot joint 40 may be connected to the first elongated portion 34. A first eyelet 42 may extend from the first pivot joint 40 on one side and a second eyelet 44 may extend from the first pivot joint 40 on a second side. A first bolt 41 may be provided to be inserted through the first eyelet 42 and threaded into the first threaded sleeve 28. Similarly, a second bolt 43 may be provided to be inserted through the second eyelet 44 and threaded into the second threaded sleeve 30.

In a number of variations the second elongated portion 36 of the lower control arm 32 may have a pivotal bearing 46 attached thereto. A connector 48 may receive the pivotal bearing 46 that may be constructed and arranged for attachment to the side rail 20 at a location spaced a distance from the bracket 26. The third elongated portion 38 may include a pin 50 attached thereto for connection to a ball joint of the suspension system of the vehicle.

Figure 2:
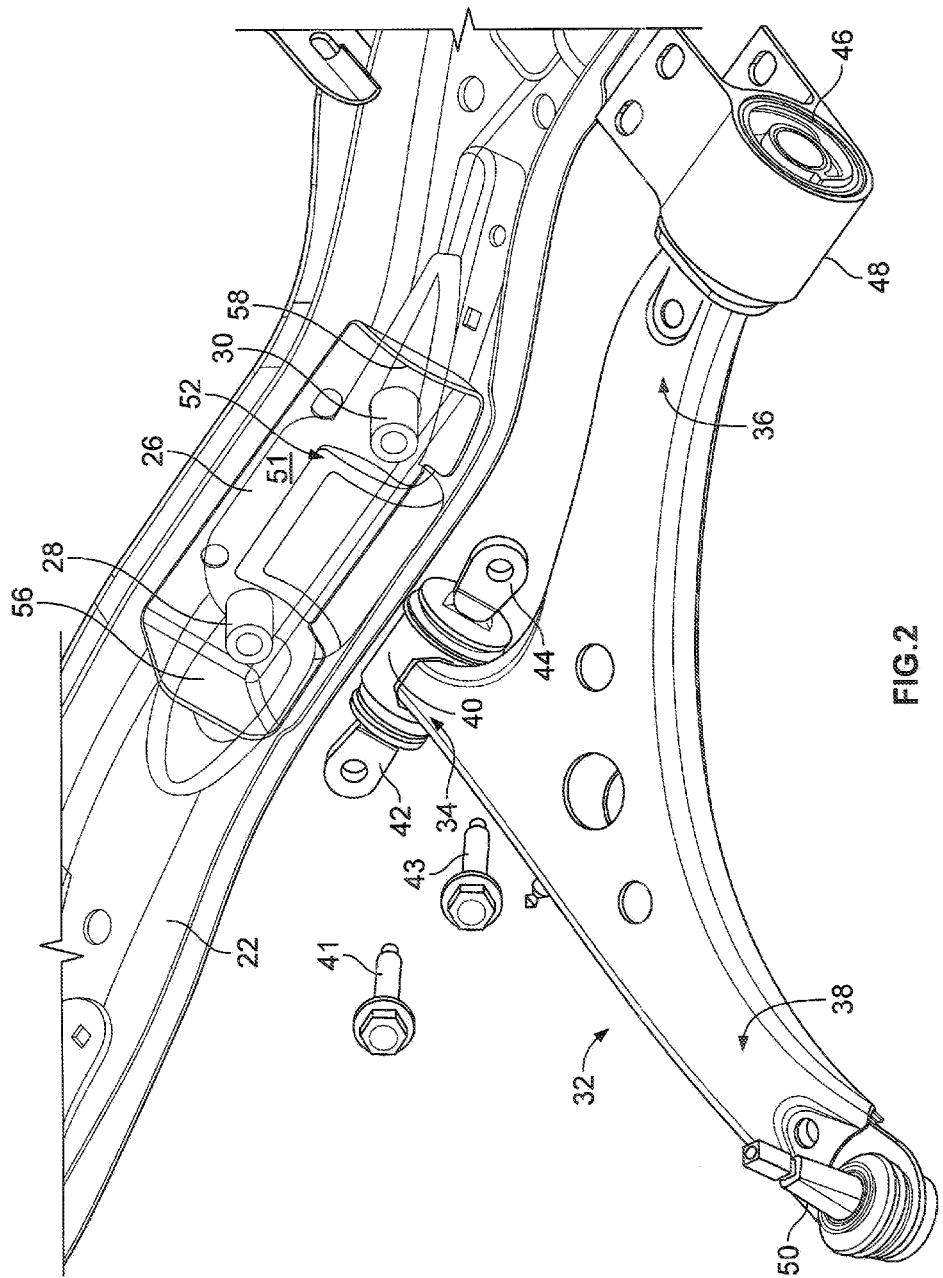
FIG. 2 is an enlarged view of a portion of FIG. 1.

As illustrated in FIG. 2, in a number of variations of the invention the bracket 26 may include a first flange 56 extending from a body portion 51 of the bracket. In a number of variations the first flange 56 may be L-shaped and may extend from the body portion 51 along a corner thereof. Similarly, a second flange 58 may extend from the body portion 51 along another corner portion thereof. In a number of variations of the invention the bracket 26 may include an alignment feature, for example, a pocket 52 formed therein to receive at least a portion of the pivotal joint 40 attached to the first elongated portion 34 of the lower control arm 32. The alignment feature 52 may mate with a similar feature (not shown) formed on the front face 22 of the side rail 20.

Figure 3:
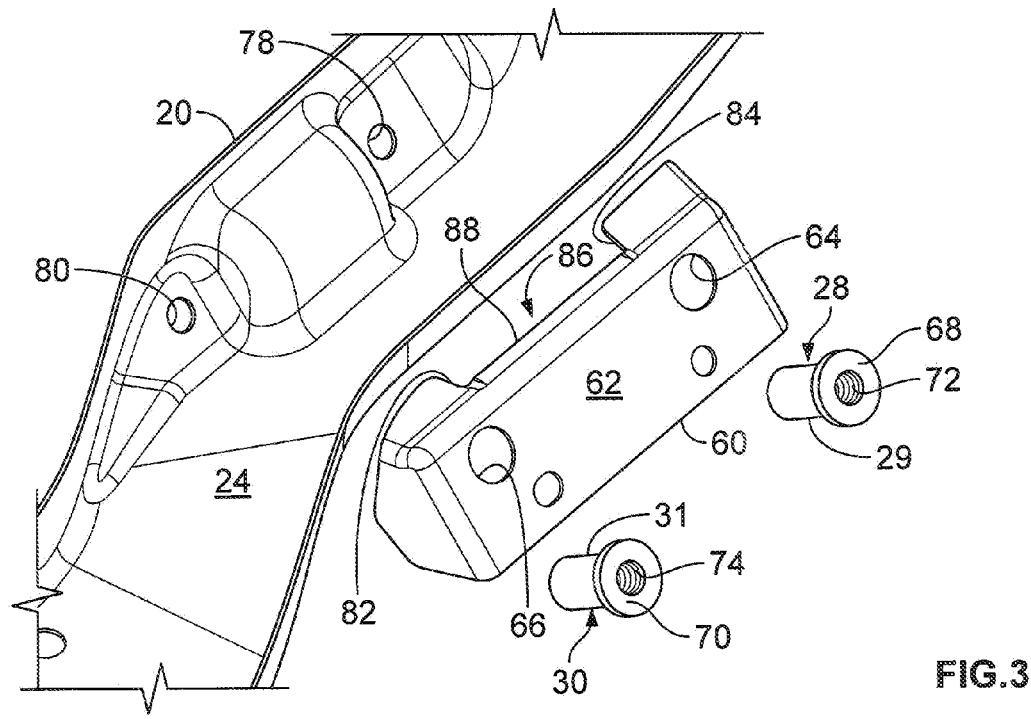
FIG. 3 illustrates a product including a front lower control arm attachment system including a sleeve locator and at least one threaded sleeve according to a number of variations of the invention.

FIG. 3 illustrates a number of variations of the invention which may include a product 10 including a sleeve locator 60 which may be a metal stamping and may have a body portion 62 and one or more through holes 64 (first through hole), 66 (second through hole) formed therein. The first through hole 64 and second through hole 66 may be oversized to receive the first threaded sleeve 28 and second threaded sleeve 30 respectively. The first threaded sleeve 28 may include a cylindrical portion 29 and a first annular flange 68 may extend therefrom. A threaded through hole 72 may be formed in the threaded sleeve 28. Similarly, the second threaded sleeve 30 may include a cylindrical portion 31 and a second annular flange 70 may extend therefrom. A second threaded through hole 74 may be formed in the second threaded sleeve 30.

The side rail 20 may have a rear face 24 having a first through hole 78 and second through hole 80 formed therein. The rear face 24 may have an embossment 76 associated with the alignment feature, for example, a pocket formed in the first face 22 to which the alignment feature 52 (e.g., pocket) formed in the bracket 26 is associated. The sleeve locator 60 may include a first flange 82 extending from the body portion 62 and may be positioned along a corner thereof, and a second flange 84 may extend from the body portion and may be positioned along a corner thereof. The first flange 82 and second flange 84 may provide a slot 86 along a side edge 88 of the body portion 62 of the sleeve locator 60. The slot 86 may be constructed and arranged to receive the embossment 76 formed in the rear face 24 of the side rail 20.

In a number of variations, the first threaded sleeve 28 may be inserted through the first through hole 64 formed in the sleeve locator 60 and the second threaded sleeve 30 may be inserted in the second through hole 66 formed in the sleeve locator 60. Thereafter, the first threaded sleeve 24 and second threaded sleeve 30 may be secured to the sleeve locator 60 by any of a variety of methods including, but not limited to, welding. When the first threaded sleeve 28 and second threaded sleeve 30 are secured to the sleeve locator 60, the first and second threaded sleeve 28, 30 can be properly positioned and inserted through the first through hole 78 and second through hole 80, respectively, formed in the side rail 20. Such an arrangement may prevent misalignment of the threaded sleeves 28, 30 and therefore may eliminate the need to align the vehicle in the assembly plant. If desired, the sleeve locator 60 having the first threaded sleeve 28 and second threaded sleeve 30 secured thereto may be secured to the rear face 24 of the side rail 20 by any of a variety of means including, but not limited to, welding.

Figure 4:
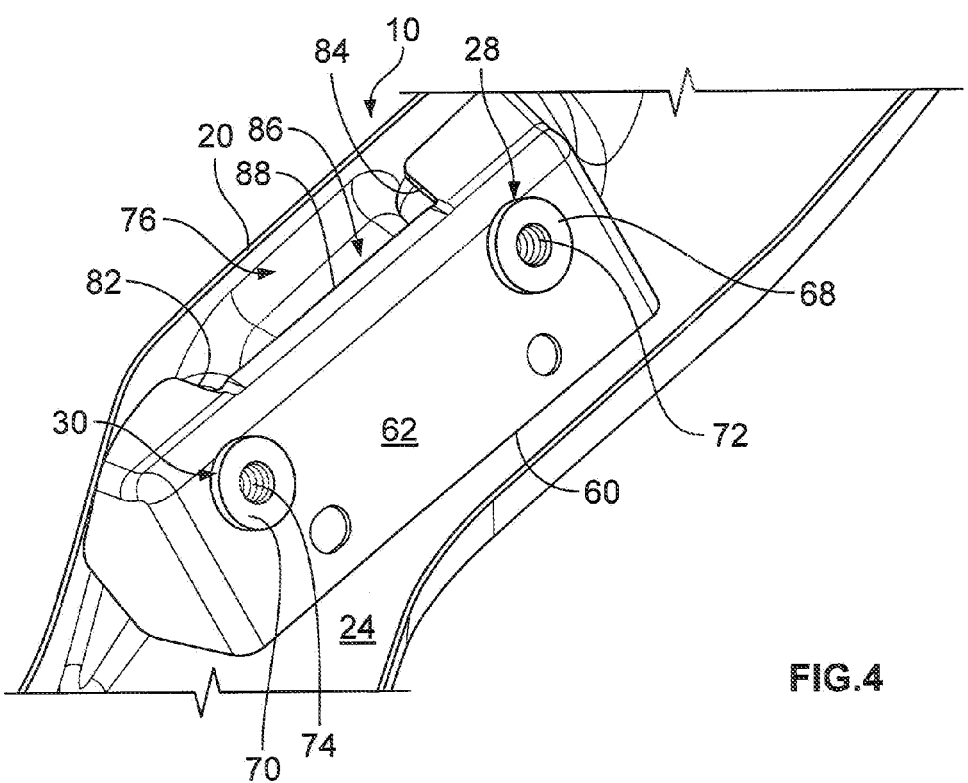
FIG. 4 illustrates a product including a front lower control arm attachment system including a sleeve locator and at least one threaded sleeve extending through the sleeve locator, and wherein the sleeve locator is secured to a rear face of side rail of a vehicle engine cradle.

FIG. 4 illustrates a product 10 including a front lower control attachment system secured to a side rail 20 of a vehicle cradle wherein the front lower control attachment system includes a sleeve locator 60 having a first threaded sleeve 28 and second threaded sleeve 30 secured thereto.

In a number of variations a front lower control arm attachment system may include only one of the sleeve locator 60 or bracket assembly 26. The alignment features of the sleeve locator 60 and the side rail 20 may be constructed and arrange so that the sleeve locator 60 may be at least temporary positioned and held in place on the side rail 20 while the sleeve locator 60 is fixed to the side rail 20, for example, by welding. Similarly, the alignment features of the bracket assembly 26 and the side rail 20 may be constructed and arranged so that the bracket assembly 26 may be at least temporary positioned and held in place on the side rail 20 while the bracket assembly 26 is fixed to the side rail 20, for example, by welding. In a number of variations of the invention features are constructed and arranged in the side rail 20 and at least one of bracket assembly 26 or sleeve locator 60 so that the at least one of bracket assembly 26 or sleeve locator 60 hangs on the side rail 20 prior to and/or during the permanent attachment (for example by welding) of the at least one of bracket assembly 26 or sleeve locator 60 to the side rail 20. In a number of variations, the bracket assembly 26 may serve as the sleeve locator 60.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a method comprising providing a front lower control arm attachment system including a sleeve locator and at least one threaded sleeve extending there through, and attaching the front lower control arm attachment system to a vehicle engine cradle.

Variation 2 may include a method as set forth in Variation 1 further comprising inserting the at least one threaded sleeve through in a through hole formed in the sleeve locator and securing the threaded sleeve to the sleeve locator.

Variation 3 may include a method as set forth in Variations 1-2 wherein the securing the threaded sleeve to the sleeve locator comprising welding the threaded sleeve to the sleeve locator.

Variation 4 may include a method as set forth in Variations 1-3 wherein cradle comprises a side rail having a front face and a rear face, and wherein the side rail has a through hole formed therein, inserting the threaded sleeve through the through hole formed in the side rail so that the sleeve locator engages the rear face of the side rail, placing a bracket assembly having a through hole formed therein in engagement with the front face of the side rail and so that the threaded sleeve extends through the through hole in the bracket assembly, and securing the bracket assembly to the front face of the side rail.

Variation 5 may include a method as set forth in Variations 1-4 wherein the securing the bracket assembly to the front face of the side rail comprises welding the bracket assembly to the front face of the side rail.

Variation 6 may include a method comprising providing an engine cradle comprising a side rail having a front face and a rear face, the side rail having a through hole formed therein, a lower control arm attachment assembly secured to the a lower control arm having a first elongated portion and a first eyelet connected to the first elongated portion, and a sleeve locator and at least one threaded sleeve attached thereto, the sleeve locator engaging the rear face of the side rail, and a bracket assembly having a through hole formed therein and wherein the bracket assembly engages the front face of the side rail, the threaded sleeve extending through the through hole in the side rail and through the though hole in the bracket assembly; providing a lower control arm for a suspension, the lower control arm having a first elongated portion and a first eyelet connected to the first elongated portion; inserting a first threaded bolt thought the first eyelet and threading the bolt into the threaded sleeve.

Variation 7 may include product comprising a front lower control arm attachment system comprising a sleeve locator and at least one threaded sleeve extending through the sleeve locator and secured thereto.

Variation 8 may include a method as set forth in Variation 7 further comprising a bracket assembly having a through hole formed therein for securing to a front face of a side rail of an engine cradle.

Variation 9 may include a method as set forth in Variations 7-8 further comprising a side rail for an engine cradle having a front face and a rear face and a through hole formed through the side rail, wherein the threaded sleeve extends through the through hole in the in the side rail and the bracket assembly, wherein the sleeve locator engages the rear face and the bracket assembly engages the front face, and wherein the bracket assembly is secured to the front face.

Variation 10 may include a method as set forth in Variations 7-10 wherein the bracket assembly is welded to the front face.

Variation 11 may include a method as set forth in Variations 7-10 further comprising a lower control arm for a suspension having a first elongated portion having a pivot joint attached thereto, at least one eyelet attached to the pivot joint, a threaded bolt extending through the at least one eyelet and threaded in the threaded sleeve.

Variation 12 may include a product comprising a first threaded sleeve and a second threaded sleeve, and a sleeve locator having a first through hole formed therein constructed and arranged to receive a portion of the first threaded sleeve, the sleeve locator having a second through hole formed therein constructed and arranged to receive a portion of the second threaded sleeve, and a bracket assembly having a first through hole formed therein constructed and arranged to receive a portion of the first threaded sleeve, the bracket assembly having a second through hole formed therein constructed and arranged to receive a portion of the second threaded sleeve.

Variation 13 may include a method as set forth in Variation 12 wherein the first threaded sleeve and the second threaded sleeve are each welded to the sleeve locator.

Variation 14 may include a method as set forth in Variations 12-13 wherein the sleeve locator comprises a metal stamping.

Variation 15 may include a product or a method as set forth in Variations 2-11 wherein the sleeve locator comprises a metal stamping.

Variation 16 may include a method comprising providing a front lower control arm attachment system including at least one of a sleeve locator or a bracket assembly, and at least one threaded sleeve extending through the at least one of a sleeve locator or a bracket assembly, and attaching the front lower control arm attachment system to a vehicle engine cradle.

Variation 17 may include a method as set forth in Variation 16 further comprising inserting the at least one threaded sleeve through in a through hole formed in the at least one of a sleeve locator or a bracket assembly, and securing the threaded sleeve to the at least one of a sleeve locator or a bracket assembly.

Variation 18 may include a method as set forth in Variation 17 wherein the securing the threaded sleeve to the at least one of a sleeve locator or a bracket assembly comprising welding the threaded sleeve to the at least one of a sleeve locator or a bracket assembly.

Variation 19 may include a method as set forth in Variations 16-18 wherein the at least one of a sleeve locator or a bracket assembly comprises a sleeve locator; providing a side rail for an engine cradle, and wherein sleeve locator is secured to the engine cradle; providing a lower control arm for a suspension, the lower control arm having a first elongated portion and a first eyelet connected to the first elongated portion; inserting a first threaded bolt thought the first eyelet and threading the bolt into the threaded sleeve.

Variation 20 may include a method as set forth in Variations 16-19 wherein the sleeve locator comprises a metal stamping.

The above description of select examples of the invention is merely exemplary in nature and, thus, variations or variants thereof are not to be regarded as a departure from the spirit and scope of the invention.

What is claimed is:

1. A method comprising providing a front lower control arm attachment system including a sleeve locator and at least one first threaded sleeve and at least one second threaded sleeve extending there through, and attaching the front lower control arm attachment system to a vehicle engine cradle so that the at least one first threaded sleeve and the at least one second threaded sleeve extend through a portion of the vehicle engine cradle, wherein each of the first threaded sleeve and second threaded sleeve includes an annular flange, the engine cradle including a first portion having a first side and an opposite second side, the sleeve locator on the first side of the first portion and wherein the annular flange of the first threaded sleeve and the annular flange of the second threaded sleeve abut the sleeve locator.

2. The method as set forth in claim 1 further comprising inserting the at least one first threaded sleeve and the at least one second threaded sleeve through a first through hole and a second through hole formed in the sleeve locator and securing the at least one first threaded sleeve and the at least one second threaded sleeve to the sleeve locator.

3. The method as set forth in claim 2 wherein securing the at least one first threaded sleeve and the at least one second threaded sleeve to the sleeve locator comprises welding the at least one first threaded sleeve and the at least one second threaded sleeve to the sleeve locator.

4. The method as set forth in claim 1 wherein the sleeve locator comprises a metal stamping.

5. A method comprising
   providing an engine cradle comprising a side rail having a front face and a rear face, the side rail having at least one first through hole and at least one second through hole formed therein, a lower control arm attachment assembly secured to a lower control arm having a first elongated portion and a first and a second eyelet connected to the first elongated portion, and a sleeve locator and at least one first threaded sleeve and at least one second threaded sleeve attached thereto, the sleeve locator engaging the rear face of the side rail, and a bracket assembly having at least one first through hole and at least one second through hole formed therein and wherein the bracket assembly engages the front face of the side rail, the at least one first threaded sleeve and the at least one second threaded sleeve extending through the at least one first through hole and the at least one second through hole in the side rail and through the at least one first through hole and the at least one second through hole in the bracket assembly;
   providing the lower control arm for a suspension;
   inserting a first threaded bolt thought the first eyelet and a second threaded bolt through the second eyelet and threading the first and the second bolts into the at least one first threaded sleeve and the at least one second threaded sleeve.

6. A product comprising a front lower control arm attachment system comprising a sleeve locator and at least one first threaded sleeve and at least one second threaded sleeve extending through the sleeve locator and secured thereto, and wherein the sleeve locator includes a body having a first flange and a second flange which form a slot constructed and arranged to receive an embossment formed in a side rail.

7. The product as set forth in claim 6 further comprising a bracket assembly having at least one first through hole and at least one second through hole formed therein for securing to a front face of the side rail of an engine cradle.

8. The product as set forth in claim 7 wherein the bracket assembly is welded to the front face.

9. The product as set forth in claim 6 further comprising a lower control arm for a suspension having a first elongated portion having a pivot joint attached thereto, at least one eyelet attached to the pivot joint, a threaded bolt extending through the at least one eyelet and threaded in at least one of the first or the second threaded sleeve.

10. A product comprising a first threaded sleeve and a second threaded sleeve, and a sleeve locator having a first through hole formed therein constructed and arranged to receive a portion of the first threaded sleeve, the sleeve locator having a second through hole formed therein constructed and arranged to receive a portion of the second threaded sleeve, and a bracket assembly having a first through hole formed therein constructed and arranged to receive a portion of the first threaded sleeve, the bracket assembly having a second through hole formed therein constructed and arranged to receive a portion of the second threaded sleeve, wherein each of the first threaded sleeve and second threaded sleeve includes an annular flange, the bracket assembly including a first portion having a first side and an opposite second side, the sleeve locator on the first side of the first portion and wherein the annular flange of the first threaded sleeve and the annular flange of the second threaded sleeve abut the sleeve locator.

11. The product as set forth in claim 10 wherein the first threaded sleeve and the second threaded sleeve are each welded to the sleeve locator.

12. The product as set forth in claim 10 wherein the sleeve locator comprises a metal stamping.

13. A method comprising providing a front lower control arm attachment system including a sleeve locator and a bracket assembly, and at least one first threaded sleeve and at least one second threaded sleeve extending through at least one of the sleeve locator or the bracket assembly, and attaching the sleeve locator to a rear face of a vehicle engine cradle and attaching the bracket assembly to a front face of the vehicle engine cradle.

14. The method as set forth in claim 13 further comprising inserting the at least one first threaded sleeve and the at least one second threaded sleeve through a first through hole and a second through hole formed in at least one of the sleeve locator or the bracket assembly, and securing the at least one first threaded sleeve and the at least one second threaded sleeve to at least one of the sleeve locator or the bracket assembly.

15. The method as set forth in claim 14 wherein securing the at least one first threaded sleeve and the at least one second threaded sleeve to at least one of the sleeve locator or the bracket assembly comprises welding the at least one first threaded sleeve and the at least one second threaded sleeve to at least one of the sleeve locator or the bracket assembly.

16. The method as set forth in claim 13 further comprising; providing a lower control arm for a suspension, the lower control arm having a first elongated portion and a first eyelet connected to the first elongated portion; inserting a first threaded bolt thought the first eyelet and threading the bolt into the at least one first threaded sleeve.

17. The method as set forth in claim 16 wherein the sleeve locator comprises a metal stamping.

18. A method comprising providing a front lower control arm attachment system including a sleeve locator and at least one first threaded sleeve and at least one second threaded sleeve extending there through, and attaching the front lower control arm attachment system to a vehicle engine cradle;
wherein the cradle comprises a side rail having a front face and a rear face, and wherein the side rail has at least one first through hole and at least one second through hole formed therein, inserting the at least one first threaded sleeve and the at least one second threaded sleeve through the at least one first through hole and the at least one second through hole formed in the side rail so that the sleeve locator engages the rear face of the side rail, placing a bracket assembly having at least one first through hole and at least one second through hole formed therein in engagement with the front face of the side rail and so that the at least one first threaded sleeve and the at least one second threaded sleeve extend through the at least one first through hole and at least one second through hole in the bracket assembly, and securing the bracket assembly to the front face of the side rail.

19. The method as set forth in claim 18 wherein securing the bracket assembly to the front face of the side rail comprises welding the bracket assembly to the front face of the side rail.

20. A product comprising a front lower control arm attachment system comprising;
a sleeve locator and at least one first threaded sleeve and at least one second threaded sleeve extending through the sleeve locator and secured thereto;
a bracket assembly having at least one first through hole and at least one second through hole formed therein for securing to a front face of a side rail of an engine cradle;
the side rail for the engine cradle having the front face and a rear face and at least one first through hole and at least one second through hole formed through the side rail;
wherein the at least one first threaded sleeve and the at least one second threaded sleeve extend through the at least one first through hole and the at least one second through hole in the side rail and the bracket assembly; and
wherein the sleeve locator engages the rear face and the bracket assembly engages the front face, and wherein the bracket assembly is secured to the front face.

* * * * *